UNITED STATES PATENT OFFICE.

CHRISTOPHER L. FRINK, OF ROCKVILLE, CONNECTICUT, ASSIGNOR, BY MESNE ASSIGNMENTS, TO OSCAR T. EARLE.

IMPROVEMENT IN VULCANIZED RUBBER COMPOUNDS FOR PACKINGS AND OTHER PURPOSES.

Specification forming part of Letters Patent No. 54,523, dated May 8, 1866; reissue No. 4,942, dated June 11, 1872; reissue No. 6,014, dated August 11, 1874; application filed August 8, 1874.

*To all whom it may concern:*

Be it known that CHRISTOPHER L. FRINK, of Rockville, in the county of Tolland and State of Connecticut, invented certain Improvements in Vulcanized Rubber Compounds for Packing and other Purposes, of which the following is a specification:

The nature of this invention relates to a new and improved composition for the manufacture of packing, and for joints and valves exposed to the action of steam or other corrosive fluids, so that they will be perfectly free from all adhesive properties. It consists of a vulcanized rubber compound suitable for making packing valves and joints, made by combining metallic filings—such as brass—with rubber and sulphur, and the materials usually employed in the manufacture of vulcanized rubber, in such proportions that after the mass is heated to a suitable vulcanizing temperature it will form a refractory rubber compound capable of withstanding the action of acids and other corrosive fluids, and steam, and the vapor of other fluids at high temperatures.

In carrying out this invention, a compound of india-rubber, sulphur, plumbago, or black lead, or other equivalent material, usually mixed with rubber to give consistency, is used, to which are added metal filings, (brass being used by preference.) The metal filings which are used in this composition are usually obtained from the pin-factories; but they may be prepared expressly for the purpose, according to the nature of the packing to be made. The proportions of the ingredients may be varied to suit the nature of the valves to be made; but for ordinary purposes the following proportions have been found to answer well, viz: Rubber, ten parts, by weight; plumbago, twenty parts, by weight; carbonate of lead, or litharge, six parts, by weight; sulphur, four parts, by weight; brass filings, six parts, by weight. The ingredients are well mixed and incorporated in the ordinary manner, well understood by rubber-manufacturers, and rolled into sheets or pressed into molds of proper shape. The mass is then vulcanized at a temperature ranging from the ordinary vulcanizing temperatures up to 300° Fahrenheit, or thereabout.

The rubber packings heretofore employed have generally contained fibrous material, which, when exposed to heat, is destroyed or greatly impaired, so as to render the packings easily blown out. The addition of metal filings hardens the compound and renders it durable. It is found that brass filings, as herein described, give the best result; but the invention is not limited to that metal, nor to the proportions given above, as these may be varied to change the hardness or elasticity, so as to adapt it to the size and general nature of the article to be made, as is well understood by rubber-manufacturers.

What is claimed as the invention of C. L. FRINK is—

1. A vulcanized rubber compound suitable for resisting heat and chemical action, composed of metal filings, rubber, sulphur, metallic oxides, and earthy materials, substantially as herein named.

2. The combination of brass or other metallic filings, rubber, sulphur, plumbago, and carbonate of lead, or litharge, in the proportions substantially as set forth.

In testimony whereof I have signed this specification this 8th day of August, 1874.

OSCAR T. EARLE.

Witnesses:

CHAS. P. WEBSTER,
GEO. W. STOKES.